US009025841B2

(12) United States Patent
Wels et al.

(10) Patent No.: US 9,025,841 B2
(45) Date of Patent: May 5, 2015

(54) METHOD AND SYSTEM FOR SEGMENTATION OF THE PROSTATE IN 3D MAGNETIC RESONANCE IMAGES

(75) Inventors: Michael Wels, Bamberg (DE); Michael Suehling, Erlangen (DE); Michael Kelm, Erlangen (DE); Sascha Seifert, Königsbach-Stein (DE); Maria Jimena Costa, Nuremberg (DE); Alexander Cavallaro, Uttenreuth (DE); Martin Huber, Uttenreuth (DE); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 711 days.

(21) Appl. No.: 12/946,909

(22) Filed: Nov. 16, 2010

(65) Prior Publication Data

US 2011/0116698 A1    May 19, 2011

Related U.S. Application Data

(60) Provisional application No. 61/262,330, filed on Nov. 18, 2009.

(51) Int. Cl.
*G06K 9/00* (2006.01)
*G06K 9/62* (2006.01)
*G06T 7/00* (2006.01)

(52) U.S. Cl.
CPC ............ *G06K 9/6207* (2013.01); *G06T 7/0012* (2013.01); *G06T 7/0083* (2013.01); *G06T 7/0089* (2013.01); *G06T 2207/10081* (2013.01); *G06T 2207/10088* (2013.01); *G06T 2207/30081* (2013.01)

(58) Field of Classification Search
None
See application file for complete search history.

(56) References Cited

U.S. PATENT DOCUMENTS

| 5,751,838 | A  | * | 5/1998  | Cox et al.      | 382/107 |
|-----------|----|---|---------|-----------------|---------|
| 7,136,516 | B2 | * | 11/2006 | Alyassin        | 382/128 |
| 7,916,919 | B2 | * | 3/2011  | Zheng et al.    | 382/131 |
| 8,068,654 | B2 | * | 11/2011 | Barbu et al.    | 382/131 |
| 8,073,252 | B2 | * | 12/2011 | Florin et al.   | 382/173 |
| 8,098,918 | B2 | * | 1/2012  | Zheng et al.    | 382/131 |
| 2005/0283054 | A1 | * | 12/2005 | Reiman       | 600/300 |
| 2007/0014462 | A1 | * | 1/2007  | Rousson et al. | 382/128 |
| 2008/0085050 | A1 | * | 4/2008  | Barbu et al.   | 382/154 |
| 2008/0101676 | A1 | * | 5/2008  | Zheng et al.   | 382/131 |
| 2008/0298659 | A1 | * | 12/2008 | Spence et al.  | 382/131 |
| 2008/0306379 | A1 | * | 12/2008 | Ikuma et al.   | 600/424 |

(Continued)

OTHER PUBLICATIONS

Deformable Segmentation of 3-D Ultrasound Prostate Images Using Statistical Texture Matching Method Yiqiang Zhan and Dinggang Shen; Mar. 2006.*

(Continued)

*Primary Examiner* — Nancy Bitar

(57) ABSTRACT

A method and system for fully automatic segmentation the prostate in multi-spectral 3D magnetic resonance (MR) image data having one or more scalar intensity values per voxel is disclosed. After intensity standardization of multi-spectral 3D MR image data, a prostate boundary is detected in the multi-spectral 3D MR image data using marginal space learning (MSL). The detected prostate boundary is refined using one or more trained boundary detectors. The detected prostate boundary can be split into patches corresponding to anatomical regions of the prostate and the detected prostate boundary can be refined using trained boundary detectors corresponding to the patches.

27 Claims, 5 Drawing Sheets

(56) References Cited

U.S. PATENT DOCUMENTS

| | | | |
|---|---|---|---|
| 2009/0030304 A1* | 1/2009 | Feiweier et al. | 600/411 |
| 2009/0316988 A1* | 12/2009 | Xu et al. | 382/173 |
| 2010/0020208 A1* | 1/2010 | Barbu | 348/250 |
| 2010/0074499 A1 | 3/2010 | Wels et al. | |
| 2010/0080434 A1* | 4/2010 | Seifert et al. | 382/131 |
| 2010/0134517 A1* | 6/2010 | Saikaly et al. | 345/619 |
| 2010/0286517 A1* | 11/2010 | Kamen et al. | 600/438 |
| 2011/0058720 A1* | 3/2011 | Lu et al. | 382/131 |

OTHER PUBLICATIONS

Four-Chamber Heart Modeling and Automatic Segmentation for 3D Cardiac CT Volumes Using Marginal Space Learning and Steerable Features Yefeng Zheng; Nov. 2008.*

Schmidt et al "Spine detection and labeling using a parts based graphical model" pp. 122-133 Oct. 2007.*

Cootes T.F. et al., "Active Shape Models—Their Training and Applicaton", Computer Vsion and Image Understanding, 61(1), Jan. 1995, pp. 38-59.

Cox, I.J. et al., "Dynamic Histogram Warping of Images Pairs for Constant Image Brightness", In IEEE International Conference on Image Processing, vol. II, Washington D.C., USA, Oct. 1995.

Georgescu, B. et al., "Database-Guided Segmentation of Anatomical Structures with Complex Appearance", In IEEE Comp. Soc. Conf. Comp. Vis. Pat. Recog., San Diego, CA, USA, Jun. 2005.

Gower, J.C., Generalized Procrustes Analysis, Psychometrika 40(1), Mar. 1975, pp. 33-50.

Tu, Z., "Probabilistic Boosting-Tree: Learning and Discriminative Models for Classification, Recognition, and Clustering", In IEEE Int'l. Conf. Comp. Vis., Beijing, China, Oct. 2005, pp. 1589-1596.

Zheng, Y., et al., "Four-Chamber Heart Modeling and Automatic Segmentation for 3D Cardiac CT Volumes Using Marginal Space Learning and Steerable Features", IEEE Transactions on Medical Imaging, 27(11), Nov. 2008, pp. 1668-1681.

Bharatha, A., et al. "Evaluation of Three-Dimensional Finite Element-Based Deformable Registration of Pre-and Intraoperative Prostate Imaging", Medical Physics 28(12) pp. 2551-2560, (2001).

Gubern-Merida, A., et al. "Atlas Based Segmentation of the Prostate in MR Images", MICCAI 2009 Prostate Segmentation Challenge, London UK. (2009).

Heimann T., et al., "3D Segmentation in the Clinic: A Grand Challenge", pp. 7-15. (2007).

Klein, S., et al. "Segmentation of the Prostate in MR Images by Atlas Matching", Proceeding of IEEE International Symposium on Biomedical Imaging, pp. 13001303. (2007).

* cited by examiner

METHOD AND SYSTEM FOR SEGMENTATION OF THE PROSTATE IN 3D MAGNETIC RESONANCE IMAGES

This application claims the benefit of U.S. Provisional Application No. 61/262,330, filed Nov. 18, 2009, the disclosure of which is herein incorporated by reference.

BACKGROUND OF THE INVENTION

The present invention relates to medical imaging of the prostate, and more particularly, to fully automatic segmentation of the prostate in 3D magnetic resonance images.

Detection and delineation of the prostate in magnetic resonance (MR) and computed tomography (CT) images is an important problem in medical imaging analysis. For example, prostate cancer is often treated by radiation therapy where precise targeting of the prostate is important. The exposure of neighboring organs, such as the bladder or the rectum, to ionizing radiation should be reduced to an absolute minimum. For this purpose, accurate localization of the prostate by exact organ delineation is critical. In addition, prostate delineation in medical images can be used for MR spectroscopy analysis (MRSI) to obtain metabolic information about prostatic tissue. Further, recent imaging techniques such as MR perfusion may also benefit from automatic prostate delineation in order to compute and normalize model parameters such as blood flow within the segmented area. Fully automatic detection of the prostate may also be useful for automatic scan range planning of subsequent scans, for example, to automatically position saturation bands.

Manual delineation of the prostate in 3D MR data, sometimes in combination with 3D CT data, is a challenging and labor intensive task, even for expert radiologists. The manual delineation of the prostate is a time-consuming process, and there is significant inter- and intra-user variability among manual segmentations of the prostate. Accordingly, a method for fully automatically segmenting the prostate in MR volumes is desirable.

BRIEF SUMMARY OF THE INVENTION

The present invention provides a method and system for automatically segmenting the prostate in multi-spectral 3D MR images. Embodiments of the present invention provide a fully automatic segmentation of the prostate with a relatively short processing time that works with several types of data including pathological cases, and provides a segmentation accuracy that allows the segmentation results to be suitable for inverse radiation therapy planning.

In one embodiment, a prostate boundary is detected in the 3D MR image data using marginal space learning (MSL). The detected prostate boundary is refined using one or more trained boundary detectors. In order to refine the detected prostate boundary, the detected prostate boundary may be split into a plurality of patches corresponding to a plurality anatomical regions, and the detected prostate boundary may be refined using a plurality of trained boundary detectors corresponding to the plurality of patches.

These and other advantages of the invention will be apparent to those of ordinary skill in the art by reference to the following detailed description and the accompanying drawings.

DETAILED DESCRIPTION

The present invention is directed to a method and system for fully automatic segmentation of the prostate in multi-spectral 3D magnetic resonance (MR) images. A multi-spectral MR image is composed of vector-valued intensity values, i.e., one or more scalar intensity values per voxel. Different MR channels (T1-weighted, T2-weighted, etc.) may emphasize on different tissue characteristics providing additional information about the depicted image content. Embodiments of the present invention are described herein to give a visual understanding of the prostate segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention are directed to fully automated prostate segmentation in multi-spectral 3D MR images. Embodiments of the present invention utilize a top-down segmentation approach based on Marginal Space Learning (MSL) to detect the prostate in a multi-spectral 3D MR image. MSL decomposes the parameter space of the prostate along decreasing levels of geometrical abstraction into subspaces of increasing dimensionality by exploiting parameter invariance. At each level of abstraction, i.e., in each subspace, strong discriminative models are trained from annotated training data, and these models are used to narrow the range of possible solutions until the final shape of the prostate can be inferred. The basic MSL framework is described in greater detail in Zheng et al., "Four-Chamber Heart Modeling and Automatic Segmentation for 3D Cardiac CT Volumes Using Marginal Space Learning and Steerable Features", IEEE T. Med. Imag. 27(11) (November 2008), pgs. 1668-1681, which is incorporated herein by reference. Contextual shape information for the prostate is introduced by representing candidate shape parameters with high-dimensional vectors of 3D generalized Haar features and steerable features derived from observed volume intensities in an MR image.

Accordingly to an embodiment of the present invention, artificially generated training data can be generated from real-world training images by randomly perturbing (12 parameter affine perturbance) the real-world training images. This dramatically reduces the amount of annotated training data needed in order to generate discriminative models of a sufficiently high accuracy.

Figure 1A:
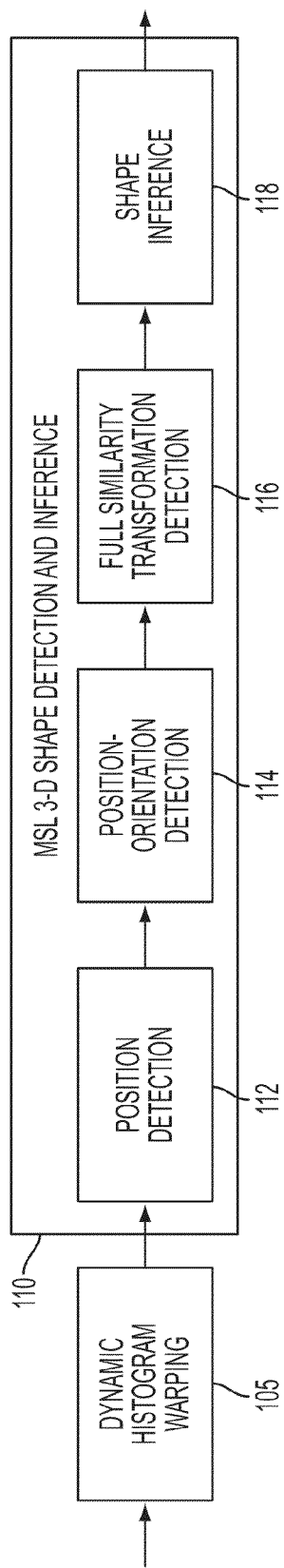
FIG. 1A illustrates a processing pipeline for prostate detection (segmentation) in 3D images according to an embodiment of the present invention.

FIG. 1A illustrates a processing pipeline for detection (segmentation) of the prostate in 3D MR images according to an embodiment of the present invention. As shown in FIG. 1A, at step 105, dynamic histogram warping (DHW) is used to standardize observed MR intensities of a multi-spectral input 3D MR image by non-rigidly aligning histograms of the observed MR intensities of the input image channels with template histograms. At step 110, an extended MSL framework, which explicitly integrates shape inference into the overall MSL formulation, is used to detect the position, orientation, scale, and shape of the prostate. In particular, the extended MSL framework includes stages of position detection (112), position-orientation detection (114), full similarity transform (position-orientation-scale) detection (116), and shape inference (118). This extended MSL framework used for prostate detection is described in greater detail below.

Figure 1B:
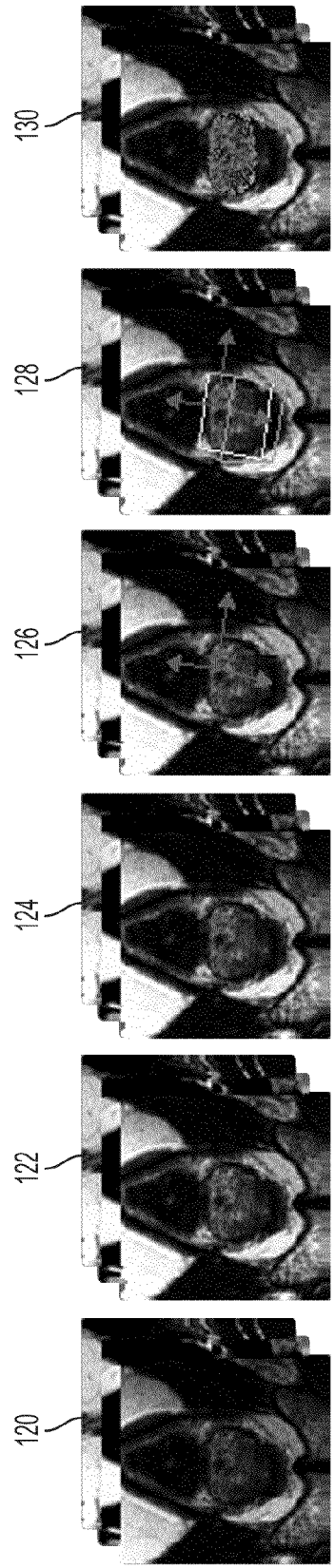
FIG. 1B illustrates results of the processing pipeline of FIG. 1A.

FIG. 1B illustrates results of the processing pipeline of FIG. 1A. In particular, FIG. 1B shows detection and delineation (segmentation) of the prostate using the method of FIG. 1A. Image 120 is a slice of an input 3D MR image. Image 122 shows results of the dynamic histogram warping (105). Images 124, 126, 128, and 130 show results of the position detection (112), position-orientation detection (114), full similarity transformation detection (116), and shape inference (118), respectively, for the prostate.

For combined 3D rigid prostate detection and shape inference, an extended MSL-based framework is used. A structure of interest's (i.e., the prostate) center is estimated as $c=(c_1, c_2, c_3) \in \mathbb{R}^3$, orientation as $R \in SO(3)$, scale as $s=(s_1, s_2, s_3) \in \{S \in \mathbb{R}^3 | s_i > 0, i=1, 2, 3\}$, and shape as $x=(x_1, y_1, z_1, \ldots, x_n, y_n, z_n)^T \in \mathbb{R}^{3n}$. The shape parameter comprises canonically sampled 3D points $x_i = (x_i, y_i, z_i)^T$, $i \in \{1, \ldots, n\}$, on the surface of the object to be segmented. Note that R is relative to c, s is relative to c and R, and x is relative to c, R, and s. Let $V=\{1, 2, \ldots, N\}$, $N \in \mathbb{N}$, be a set of indices of image voxels, $(y_v)_{v \in V}$, $y_v \in \{-1, 1\}$, a binary segmentation of the image voxels into object and non-object voxels, and $f$ be a function with $Y=f(I, \Theta)$ that provides a binary segmentation of volume I using segmentation parameters $\Theta=(c, R, s, x)$. Let $Z=(z_\Theta)$ be a family of high dimensional feature vectors extracted from a given multi-spectral input volume $I=(i_v)_{v \in V}$ and associated with different discretized configurations of $\Theta$. In embodiments of the present invention, Z can include voxel-wise context encoding multi-spectral 3D generalized Haar-like features to characterize possible object centers and multi-spectral steerable features that are capable of representing hypothetical orientations and optionally scaling relative to a given object center or shape surface point.

In order to detect the prostate, we search for an optimal parameter vector:

$$\Theta^* = \underset{\Theta}{\mathrm{argmax}}\, p(y=1 \mid \Theta, I, M^{(\Theta)}) = \underset{\Theta}{\mathrm{argmax}}\, p(y=1 \mid Z, M^{(\Theta)}) \quad (1)$$

maximizing the posterior probability of the presence, i.e., y=1, of the prostate given the discriminative model $M^{(\Theta)}$ and the features Z extracted from the input volume I using a certain set of values for the parameters $\Theta$.

Let $\pi^{(c)}(Z)$, $\pi^{(c,R)}(Z)$, $\pi^{(c,R,s)}(Z)$, and $\pi^{(c,R,s,x)}(Z)$ denote the vectors of components of Z associated with individual groups of elements (c), (c,R), (c, R, s), and (c, R, s, x) of the parameter vector $\Theta$. The MSL method avoids exhaustively searching the high-dimensional parameter space spanned by all possible $\Theta$ by exploiting the fact that ideally for any discriminative model for center detection with parameters $M^{(c)}$ working on a restricted amount of possible features, $$c^* = \underset{c}{\mathrm{argmax}}\, p(y=1 \mid \pi^{(c)}, (Z), M^{(c)}) \quad (2)$$

holds, as the object center c is invariant under relative reorientation, relative rescaling, and relative shape positioning. Similarly, we have $$R^* = \underset{R}{\mathrm{argmax}}\, p(y=1 \mid \pi^{(c^*, R)}(Z), M^{(c,R)}) \quad (3)$$

for combined position-orientation detection with model parameters $M^{(c,R)}$, where only features $\pi^{(c^*, R)}(Z)$ with $c=c^*$ are considered. This is due to the fact that position and orientation are invariant under relative rescaling and relative shape positioning. Analogous considerations yield $$s^* = \underset{s}{\mathrm{argmax}}\, p(y=1 \mid \pi^{(c^*, R^*, s)}(Z), M^{(c,R,s)}) \quad (4)$$

for the target object's scaling, and $$x^* = \underset{x}{\mathrm{argmax}}\, p(y=1 \mid \pi^{(c^*, R^*, s^*, x)}(Z), M^{(c,R,s,x,y,z)}, M^{(c,R,s,x)}) \quad (5)$$

for the target object's shape where $M^{(c,R,s,x,y,z)}$ are the parameters of a local shape model with respect to individual surface points $(x, y, z)^T$, and parameters $M^{(c,R,s,x)}$ represent a global shape model. Equations (2)-(5) set up a chain of discriminative models exploiting search space parameter invariance for combined 3D shape detection and shape inference. This allows different discriminative models to be applied in descending order of geometrical abstraction as, in embodiments of the present invention, the object center c alone is the most geometrically abstract and the complete set of parameters $\Theta$ is the least abstract shape representation. Therefore, MSL establishes a hierarchical decomposition of the search space along decreasing levels of geometrical abstraction with increasing dimensionality of the considered parameter subspace.

Let Z be the set of annotated multi-spectral image volumes in their transformed feature representation as described above. Z is referred to herein as the training data. In order to detect the nine parameter similarity transformation of the optimal parameter $\Theta^*$, i.e., $c^*$, $R^*$, and $s^*$, discriminative models $P(y=1 | \pi^{(c^*)}(Z))$, $P(y=1 | \pi^{(c^*, R)}(Z))$, and $P(y=1 | \pi^{(c^*, R^*, s)}(Z))$, are learned (trained) based on the training data. Following the concept of MSL, a set of positive and negative training examples $C=\{(\pi^{(c)}(Z), y) | Z \in Z\}$ are generated from the training data to train a probabilistic boosting tree (PBT) classifier for position detection. The feature vectors $\pi^{(c)}(Z)$ can be multi-spectral 3D generalized Haar-like features encoding voxel context of candidate object centers based on observed intensity values. Decreasing the level of geometric abstraction, a PBT classifier is analogously trained for combined position-orientation detection based on an extended set of training examples $G=\{(\pi^{(c,R)}(Z), y) | Z \in Z\}$, where the feature vectors $\pi^{(c,R)}(Z)$, associated with (c,R) and a multi-spectral image volume, are multi-spectral steerable features. Steerable features allow varying orientation and scaling to be encoded in terms of aligned and scaled intensity sampling patterns. According to an advantageous implementation, multi-spectral steerable features are also used to train a PBT classifier for full nine parameter similarly transformation detection based on an extended set of training examples $S=\{(\pi^{(c,R,s)}(Z), y) | Z \in Z\}$, where $\pi^{(c,R,s)}(Z)$ is derived from (c, R, s) and the associated multi-spectral image volume.

In order to detect the final object shape for each individual brain structure, we further decompose $$\pi^{(c,R,s,x)}(Z) = (\pi^{(c,R,s,x_i,y_i,z_i)}(Z))_{i=1,\ldots,n}$$

where $\pi^{(c,R,s,x_i,y_i,z_i)}(Z)$ are the features associated with an image volume and individual relatively aligned candidate points $(c, R, s, x_i, y_i, z_i)$ for the surface of the object of interest. In order to apply discriminative modeling, we assume the $(x_i, y_i, z_i)^T$ and correspondingly $\pi^{(c,R,s,x_i,y_i,z_i)}(Z)$ to be independently and identically distributed (i.i.d.), and approximate $$x^* = \underset{x}{\operatorname{argmax}}\, p(y=1\,|\,\pi^{(c^*,R^*,s^*,x)}(Z), M^{(c,R,s,x,y,z)}, M^{(c,R,s,x)}) \approx \quad (6)$$

$$\underset{x}{\operatorname{argmax}}\left[\prod_{i=1}^{n} p(y_i=1\,|\,\pi^{(c^*,R^*,s^*,x_i,y_i,z_i)}(Z), M^{(c,R,s,x,y,z)})\right].$$

$$p(x\,|\,c^*, R^*, s^*, M^{(c,R,s,x)})$$

in an iterative manner. The term $p(y_i=1|\pi^{(c,R,s,x_i,y_i,z_i)}(Z))$ describes the probability that the relatively aligned point (c, R, s, $x_i$, $y_i$, $z_i$) is part of the shape to be inferred, i.e., lies on the surface of the target structure, and $p(x|c^*, R^*, s^*, M^{(c,R,s,x)})$ is a global shape model. The probability $p(y_i=1|\pi^{(c,R,s,x_i,y_i,z_i)}(Z))$ is estimated with a PBT classifier using multi-spectral steerable features trained on training examples $X=\{(\pi^{(c,R,s,x_i,y_i,z_i)}(Z),y)|i=1,\ldots,n;\, Z\in Z\}$. An iterative approach can be used to minimize Equation (6) as, in practice, $x=(x_1, y_1, z_1, \ldots, x_n, y_n, z_n) \in \mathbb{R}^{3n}$ only varies around the mean shape positioned relatively to the previously detected similarity transformation $(c^*, R^*, s^*)$ at time $t=0$ and the previous most likely shape in each iteration $t=1, \ldots, T$.

The global shape model can be implemented as an active shape model (ASM), which can be used to incorporate prior shape during segmentation. Active shape models are described in detail in Cootes et al. "Active Shape Models-Their Training and Application" Comp. Vis. Image Understand. 61(1) (January 1995), pgs. 38-59, which is incorporated herein by reference. In an ASM, the shape of a target structure is represented as a cloud of points, which are either manually or automatically placed at certain characteristic locations within the class of images to be processed. Once these sets of labeled point features, or landmarks, are established for each image, they are linearly aligned to each other in order to remove translation, rotation, and scaling as far as possible. This can be done using the generalized Procrustes analysis (GPA), which is well known and described in detail in Gower "Generalized Procrustes Analysis" Psychmetrika 40(1) (March 1975), pgs. 33-50, which is incorporated herein by reference. After the GPA all the shapes are transformed to a common coordinate system—the model space of the ASM. The remaining variability can be described as a prior model using a Point Distribution Model (PDM).

Figure 2:
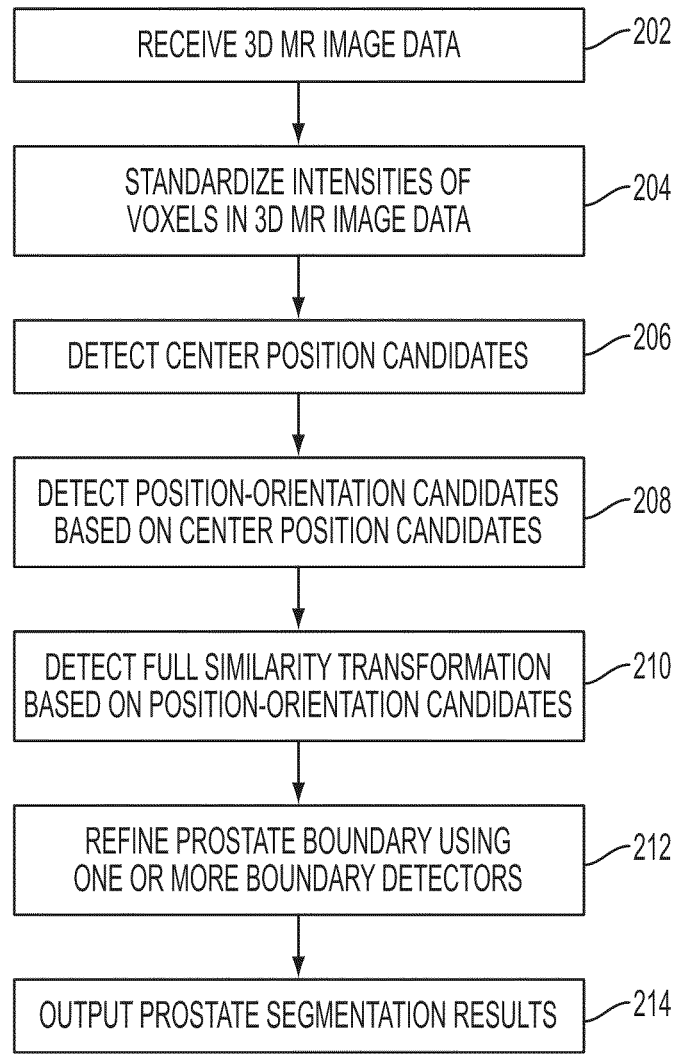
FIG. 2 illustrates a method of segmenting the prostate in 3D MR image data according to an embodiment of the present invention.

As described above, MSL-based detection can be used for segmenting target anatomic objects. FIG. 2 illustrates a method of segmenting the prostate in a multi-spectral 3D MR image according to an embodiment of the present invention. The method of FIG. 2 transforms multi-spectral 3D MR data representing a portion of the patient's anatomy to detect and segment prostate in the multi-spectral 3D MR data.

Referring to FIG. 2, at step 202, multi-spectral 3D MR image data is received. For example, at least one multi-spectral 3D MR image (volume) can be received directly from an MRI scanning device, or can be a previously stored multi-spectral 3D MR image loaded from memory or storage of a computer system, or some other computer readable medium. According to an advantageous implementation, the multi-spectral 3D MR image data may be composed of multiple mono-spectral MR image data, such as aligned T1-weighted, T2-weighted, and T2-SPACE pulse sequences.

At step 204, the voxel intensities of the received multi-spectral 3D MR image data are standardized. This intensity standardization allows the segmentation method of FIG. 2 to be performed reliably on multi-spectral 3D MR images resulting from different scanners and sites. According to an advantageous implementation, dynamic histogram warping (DHW) can be used to standardize the voxel intensities of the 3D MR image. DHW standardizes the observed MR intensities by non-rigidly aligning histograms of the observed intensities in the multi-spectral 3D MR image to template histograms. DHW is described in detail in Cox et al., "Dynamic Histogram Warping of Image Pairs for Constant Image Brightness", *IEEE Int. Conf. on Image Proc.*, Vol. II, October 1995, 366-369, which is incorporated herein by reference. In the case, in which the MR image data is multi-spectral with more than one channel, normalization may be performed separately for each image channel.

Steps 206-212 of the method of FIG. 2 illustrate the detection of the prostate in multi-spectral MR image data using MSL, as described above. In particular, steps 206-212 utilize various trained discriminative models (i.e., detectors/classifiers) that are trained based on a set of training data. According to an embodiment of the present invention, the discriminative models used in steps 206-212 are trained by artificially generating randomly perturbed training data from a small set of real-world training images. In particular, 12 parameter affine perturbation can be used to randomly perturb the real-world training images. Randomly generated 12 parameter affine transformation functions change values for the parameters of position (3 parameters), orientation (3 parameters), size (3 parameters), and skewness (3 parameters) of the annotated prostate in each real-world training image within a small range. This can result in generating a large amount of training data containing reasonable variations of the annotated prostates in the real-world training data, and overcomes the need for a large database of real-world images. As described above, the discriminative models are trained based on features extracted from the training data including multi-spectral 3D Haar-like features and multi-spectral 3D steerable features. Accordingly, the training data can be composed of aligned multi-spectral MR images and the features may be derived from the multi-spectral image data.

At step 206, center position candidates of the prostate are detected in multi-spectral MR image data using a trained position detector. The trained position detector is a trained discriminative model, such as a PBT, trained based on the training data including the artificially generated training data. The position detector is used to scan voxels of the multi-spectral 3D MR image data to search for the center position of the prostate. The position detector may scan all voxels of the multi-spectral 3D MR image data or may scan voxels within a constrained reasonable search range. The position detector returns a confidence value for every voxel that represents the probability that the voxel is the center position of the prostate. For the purposes of distinguishing more likely center candidates from less likely center candidates, a 3D context surrounding each voxel of interest is represented by 3D Haar-like features that may have been computed on all multi-spectral input sequences. These features are input to the position detectors, and a certain number of center position candidates with the highest confidence scores are kept.

At step 208, position-orientation candidates are detected based on the position candidates using a trained position-orientation detector. For each of the position candidates detected at step 206, a reasonable range of orientations is checked resulting in a number of position-orientation hypotheses. The position-orientation detector is a discriminative model, such as a PBT, trained based on the training data including the artificially generated training data. The position-orientation detector relies on multi-spectral 3D steerable features to encode contextual information derived from the MR image data and returns a confidence value for every position-orientation hypothesis. A certain number of position-orientation hypotheses with the highest confidence value are kept as the detected position-orientation candidates.

At step 210, a full similarity transformation (position-orientation-scale) is detected based on the position-orientation candidates using a trained full similarity transformation detector. For each of the position-orientation candidates detected at step 208, a reasonable range of scales is checked resulting in a number of full similarity transformation (position-orientation-scale) hypotheses. The full similarity transformation detector is a discriminative model, such as a PBT, trained based on the training data including the artificially generated training data. The full similarity transformation detector relies on 3D steerable features to encode contextual information derived from the MR image data and returns a confidence value for every full similarity transformation hypothesis. The full similarity transformation is detected based on one or more of the full similarity transformation hypotheses having the highest scores. For example, the full similarity transformation can be detected as the full similarity transformation hypothesis having the highest confidence score. Alternatively, the full similarity transformation can be detected by clustering a certain number of full similarity transformation candidates having the highest scores. The detected full similarity transformation is used to transform a prostate model, such as a mean prostate model learned from the training data, to the MR image data.

According to an exemplary embodiment, it is also possible that the full transformation detection of step 210 can be made more robust by taking into account 3D landmarks related to the prostate and detected with separate trained landmark detectors. For example, the base and the apex of the prostate can be detected using a separate trained landmark detector for each one. The positions of the detected base and apex can then be taken into account, for example using a discriminative anatomical network (DAN), when detecting the full similarity transformation of the prostate.

At step 212, the boundary of the detected prostate is refined using one or more trained boundary detectors. On the lowest level of geometrical abstraction, the shape representation of the prostate can be enriched by a triangulated mesh surface that is fit to the MR image data using the detected full similarity transformation, which can be thought of as a local coordinate system. By using a generative shape model built from the ground truth annotations, and several discriminative models (boundary detectors) relying on multi-spectral 3D steerable features for object boundary/non-boundary distinction, the final prostate shape can be inferred using an iterative search, in which the global shape's and the boundary candidates' posterior probability are maximized in turn.

According to an advantageous implementation of the present invention, in order to improve segmentation accuracy, the prostate's surface can be split into several patches for boundary detection. The patches correspond to different regions of the prostate's surface that may have different characteristics. For example, patches corresponding to the following boundary zones of the prostate may be used: anterior fibromuscular stroma, peripheral, apex, and base. By splitting the prostate's surface into several patches, patch-specific discriminative models (boundary detectors) can be trained to more precisely capture the local characteristics of each boundary patch of interest. For example, the prostate's shared boundary with the bladder largely differs in appearance from the boundary shared with the rectum. The final prostate shape can be determined using the iterative search in which the following steps are iterated: a) the global shape's posterior probability is maximized using an active shape model (ASM); b) the posterior probability of the boundary points in each patch are maximized using the trained boundary detector for that patch.

At step 214, the prostate segmentation results are output. For example, the prostate segmentation results can be output by displaying the prostate segmentation results on a display of a computer system, or other display device. It is also possible that the prostate segmentation results can be output by storing the prostate segmentation results, for example, on a storage or memory of a computer system or on a computer readable medium. Once the prostate is segmented in the 3D MR image data, volume quantification can be performed to determine the volume of the prostate. The prostate segmentation results may be used for inverse radiotherapy planning, accurate does estimation based on the volumetric measurement, and optimizing clinical workflows. The prostate segmentation can also be used in brachytherapy planning.

Figure 3:
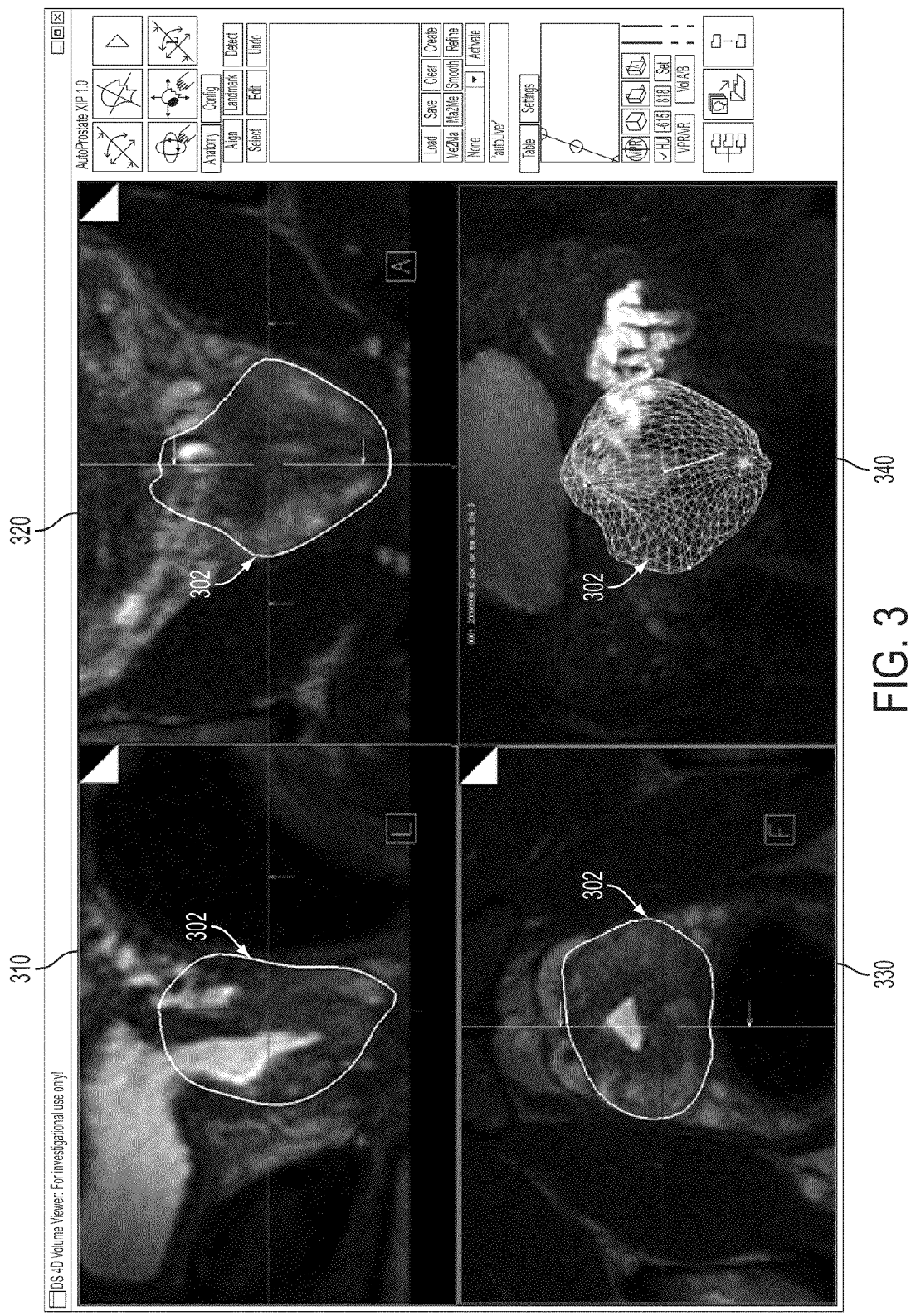
FIG. 3 illustrates exemplary prostate segmentation results segmented using the method of FIG. 2.

FIG. 3 illustrates exemplary prostate segmentation results segmented using the method of FIG. 2. As illustrated in FIG. 3, images 310, 320, and 330 are 2D slices showing different views of a 3D MR image and image 340 is a 3D rendering of the 3D MR image. Images 310, 320, 330, and 340 show the segmented prostate 302 segmented using the method of FIG. 2.

Figure 4:
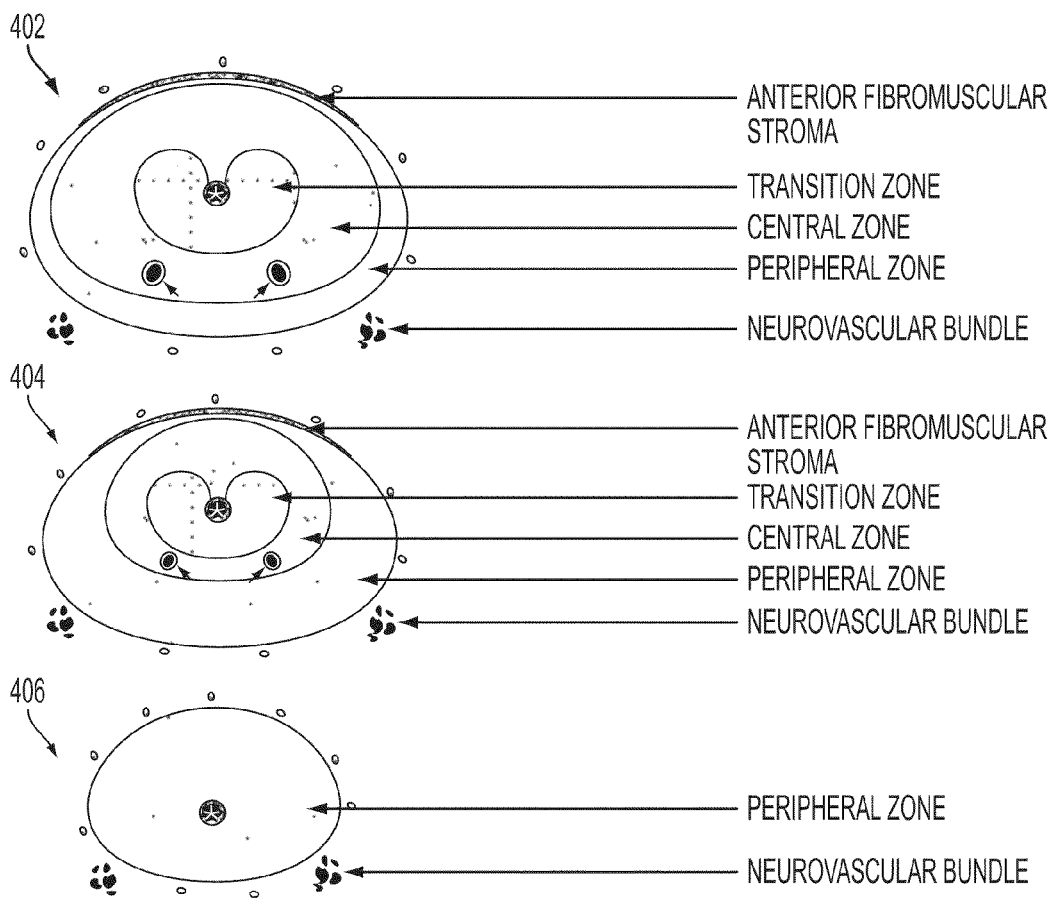
FIG. 4 illustrates axial slices showing anatomical regions of the prostate.

As described above, the method of FIG. 2 is used to segment the prostate in multi-spectral 3D MR image data. Once the prostate is segmented, a similar method can be utilized to further segment the prostate into a plurality of anatomical regions, such as the transition, central, and peripheral zones. FIG. 4 illustrates axial slices showing anatomical regions of the prostate. As illustrated in FIG. 4, axial slices 402, 404, and 406 show various anatomical regions of the prostate including the anterior fibromuscular stroma, the transition zone, the central zone, the peripheral zone, and the neurovascular bundle. In order to segment one of these regions from a segmented prostate in a multi-spectral 3D MR image, a method similar to FIG. 2 can be used, in which the discriminative models are trained for that particular region and the MSL detection of the region is constrained to within the segmented prostate.

According to an advantageous embodiment of the present invention, in addition to segmenting the prostate, anatomical landmarks associated with the prostate can also be detected using trained anatomical landmark detectors. This anatomical landmark detection can be done as part of the prostate segmentation, as described above, to achieve more robust segmentation results. Alternatively, the anatomical landmarks can be detected by constraining the anatomical landmark detectors to the segmented prostate. Anatomical landmarks associated with the prostate may include, but are not limited to the base and apex of the prostate. The detection of such anatomical landmarks associated with the prostate allows saturation bands to be placed for subsequent scans relative to the detected anatomy. In addition, the detected anatomic landmarks can be used for image registration, for example to compare the prostate in prior and follow-up scans.

Figure 5:
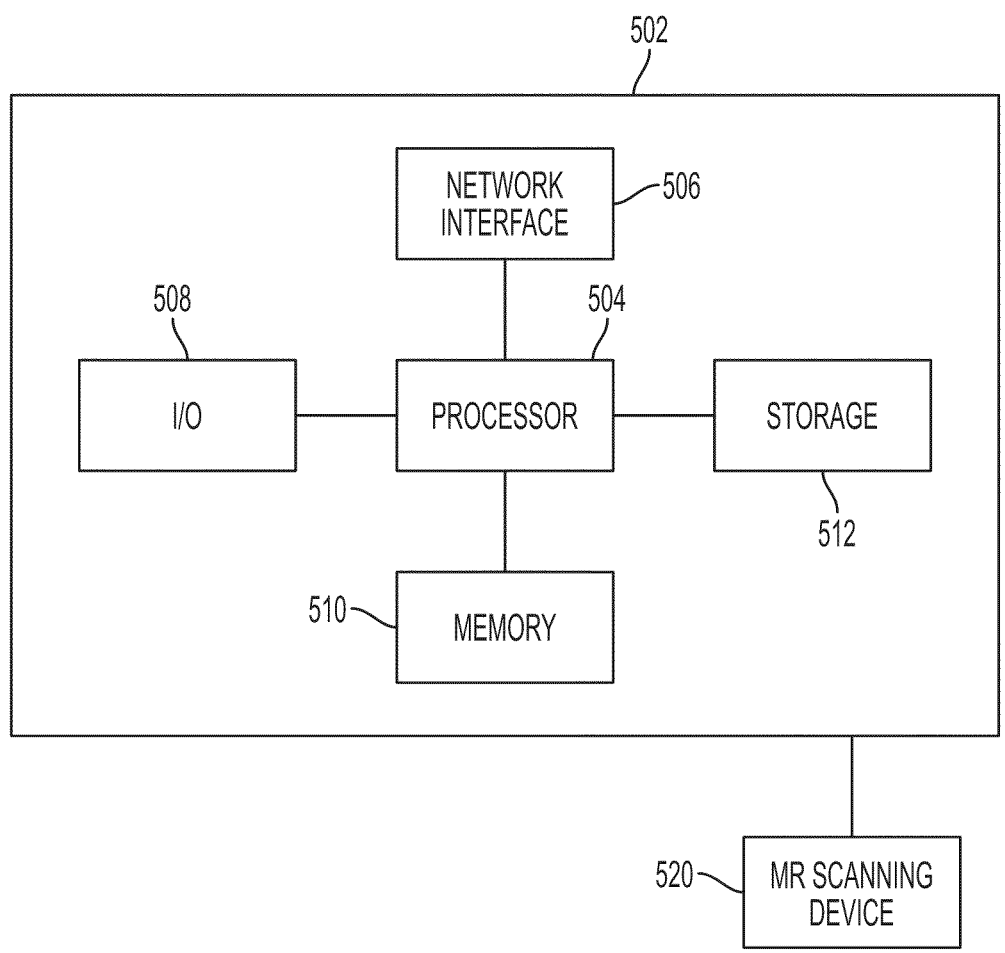
FIG. 5 is a high level block diagram of a computer capable of implementing the present invention.

The above-described methods for segmenting the prostate in multi-spectral 3D MR images may be implemented on a computer using well-known computer processors, memory units, storage devices, computer software, and other components. A high level block diagram of such a computer is illustrated in FIG. 5. Computer 502 contains a processor 504 which controls the overall operation of the computer 502 by executing computer program instructions which define such operation. The computer program instructions may be stored in a storage device 512, or other computer readable medium (e.g., magnetic disk, CD ROM, etc.) and loaded into memory 510 when execution of the computer program instructions is desired. Thus, the steps of the method of FIG. 2 may be defined by the computer program instructions stored in the memory 510 and/or storage 512 and controlled by the processor 504 executing the computer program instructions. An MR scanning device 520 can be connected to the computer 502 to input the multi-spectral MR images to the computer 502. It is possible to implement the MR scanning device 520 and the computer 502 as one device. It is also possible that the MR scanning device 520 and the computer 502 communicate wirelessly through a network. The computer 502 also includes one or more network interfaces 506 for communicating with other devices via a network. The computer 502 also includes other input/output devices 508 that enable user interaction with the computer 502 (e.g., display, keyboard, mouse, speakers, buttons, etc.). One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for prostate segmentation in multi-spectral 3D magnetic resonance (MR) image data, comprising:
    detecting a prostate boundary in the multi-spectral 3D MR image data using marginal space learning (MSL), wherein the multi-spectral 3D MR image data comprises, for each voxel of a plurality of voxels, a respective vector of intensity values representing different MR channels for that voxel; and
    refining the detected prostate boundary using one or more trained boundary detectors; wherein said step of detecting a prostate boundary in the multi-spectral 3D MR image data comprises,
    detecting prostate center position candidates using a trained position detector;
    detecting position-orientation candidates based on the prostate center position candidates using a trained position-orientation detector; and
    detecting a full similarity transformation based on the position-orientation candidates using a trained full similarity transformation detector.

2. The method of claim 1, further comprising:
    standardizing voxel intensities of the multi-spectral 3D MR image data prior to said step of detecting a prostate boundary.

3. The method of claim 1, wherein the position detector, the position-orientation detector, and the full similarity transformation detector are trained based on artificially generated training data generated by randomly perturbing real-world training data.

4. The method of claim 3, wherein the artificially generated training data is randomly perturbed by perturbing position, orientation, scale, and skewness parameters of annotated prostates in the real-world training data using a random 12 parameter affine perturbation.

5. The method of claim 1, wherein said step of refining the detected prostate boundary using one or more trained boundary detectors comprises:
    splitting the detected prostate boundary into a plurality of patches corresponding to a plurality anatomical regions; and
    refining the detected prostate boundary using a plurality of trained boundary detectors corresponding to the plurality of patches.

6. The method of claim 5, wherein said step of refining the detected prostate boundary using a plurality of trained boundary detectors corresponding to the plurality of patches comprises:
    maximizing a posterior probability of a global shape model for the prostate boundary using an active shape model; and
    maximizing a posterior probability of boundary points in each of the plurality of patches of the detected prostate boundary using the corresponding one of the plurality of boundary detectors.

7. The method of claim 1, wherein the multi-spectral 3D MR image data comprises a plurality of aligned mono-spectral MR images.

8. The method of claim 1, further comprising:
    detecting one or more anatomic landmarks associated with the prostate using one or more respective trained landmark detectors.

9. The method of claim 1, further comprising:
    segmenting one or more anatomical regions within the segmented prostate in the multi-spectral 3D MR image data using MSL constrained to the segmented prostate.

10. An apparatus for prostate segmentation in multi-spectral 3D magnetic resonance (MR) image data, comprising:
    means for detecting a prostate boundary in the multi-spectral 3D MR image data using marginal space learning (MSL), wherein the multi-spectral 3D MR image data comprises, for each voxel of a plurality of voxels, a respective vector of intensity values representing different MR channels for that voxel; and
    means for refining the detected prostate boundary using one or more trained boundary detectors; wherein said means for detecting a prostate boundary in the multi-spectral 3D MR image data comprises,
    means for detecting prostate center position candidates using a trained position detector;
    means for detecting position-orientation candidates based on the prostate center position candidates using a trained position-orientation detector; and
    means for detecting a full similarity transformation based on the position-orientation candidates using a trained full similarity transformation detector.

11. The apparatus of claim 10, further comprising:
    means for standardizing voxel intensities of the multi-spectral 3D MR image data.

12. The apparatus of claim 10, wherein the position detector, the position-orientation detector, and the full similarity transformation detector are trained based on artificially generated training data generated by randomly perturbing real-world training data.

13. The apparatus of claim 12, wherein the artificially generated training data is randomly perturbed by perturbing position, orientation, scale, and skewness parameters of annotated prostates in the real-world training data using a random 12 parameter affine perturbation.

14. The apparatus of claim 10, wherein said means for refining the detected prostate boundary using one or more trained boundary detectors comprises:
   means for splitting the detected prostate boundary into a plurality of patches corresponding to a plurality anatomical regions; and
   means for refining the detected prostate boundary using a plurality of trained boundary detectors corresponding to the plurality of patches.

15. The apparatus of claim 14, wherein said means for refining the detected prostate boundary using a plurality of trained boundary detectors corresponding to the plurality of patches comprises:
   means for maximizing a posterior probability of a global shape model for the prostate boundary using an active shape model; and
   means for maximizing a posterior probability of boundary points in each of the plurality of patches of the detected prostate boundary using the corresponding one of the plurality of boundary detectors.

16. The apparatus of claim 10, wherein the multi-spectral 3D MR image data comprises a plurality of aligned mono-spectral MR images.

17. The apparatus of claim 10, further comprising:
   means for detecting one or more anatomic landmarks associated with the prostate using one or more respective trained landmark detectors.

18. The apparatus of claim 10, further comprising:
   means for segmenting one or more anatomical regions within the segmented prostate in the multi-spectral 3D MR image data using MSL constrained to the segmented prostate.

19. A non-transitory computer readable medium encoded with computer executable instructions for prostate segmentation in multi-spectral 3D magnetic resonance (MR) image data, the computer executable instructions defining steps comprising:
   detecting a prostate boundary in the multi-spectral 3D MR image data using marginal space learning (MSL), wherein the multi-spectral 3D MR image data comprises, for each voxel of a plurality of voxels, a respective vector of intensity values representing different MR channels for that voxel; and
   refining the detected prostate boundary using one or more trained boundary detectors; wherein the computer executable instructions defining the step of detecting a prostate boundary in the multi-spectral 3D MR image data comprise computer executable instructions defining the steps of:
   detecting prostate center position candidates using a trained position detector;
   detecting position-orientation candidates based on the prostate center position candidates using a trained position-orientation detector; and
   detecting a full similarity transformation based on the position-orientation candidates using a trained full similarity transformation detector.

20. The computer readable medium of claim 19, further comprising computer executable instructions defining the step of:
   standardizing voxel intensities of the multi-spectral 3D MR image data prior to said step of detecting a prostate boundary.

21. The computer readable medium of claim 19, wherein the position detector, the position-orientation detector, and the full similarity transformation detector are trained based on artificially generated training data generated by randomly perturbing real-world training data.

22. The computer readable medium of claim 21, wherein the artificially generated training data is randomly perturbed by perturbing position, orientation, scale, and skewness parameters of annotated prostates in the real-world training data using a random 12 parameter affine perturbation.

23. The computer readable medium of claim 19, wherein the computer executable instructions defining the step of refining the detected prostate boundary using one or more trained boundary detectors comprise computer executable instructions defining the steps of:
   splitting the detected prostate boundary into a plurality of patches corresponding to a plurality anatomical regions; and
   refining the detected prostate boundary using a plurality of trained boundary detectors corresponding to the plurality of patches.

24. The computer readable medium of claim 23, wherein the computer executable instructions defining the step of refining the detected prostate boundary using a plurality of trained boundary detectors corresponding to the plurality of patches comprise computer executable instructions defining the steps of:
   maximizing a posterior probability of a global shape model for the prostate boundary using an active shape model; and
   maximizing a posterior probability of boundary points in each of the plurality of patches of the detected prostate boundary using the corresponding one of the plurality of boundary detectors.

25. The computer readable medium of claim 19, wherein the multi-spectral 3D MR image data comprises a plurality of aligned mono-spectral MR images.

26. The computer readable medium of claim 19, further comprising computer executable instructions defining the step of:
   detecting one or more anatomic landmarks associated with the prostate using one or more respective trained landmark detectors.

27. The computer readable medium of claim 19, further comprising computer executable instructions defining the step of:
   segmenting one or more anatomical regions within the segmented prostate in the multi-spectral 3D MR image data using MSL constrained to the segmented prostate.

* * * * *